United States Patent [19]

Corrigall

[11] Patent Number: 5,513,093
[45] Date of Patent: Apr. 30, 1996

[54] REDUCED OPEN CIRCUIT VOLTAGE POWER SUPPLY AND METHOD OF PRODUCING THEREFOR

[75] Inventor: Don J. Corrigall, Appleton, Wis.

[73] Assignee: Miller Electric Mfg. Co., Appleton, Wis.

[21] Appl. No.: 212,195

[22] Filed: Mar. 11, 1994

[51] Int. Cl.⁶ .............................. H02M 5/42; B23K 9/10
[52] U.S. Cl. ........................................ 363/85; 219/130.1
[58] Field of Search .................... 363/37, 54, 57, 363/74, 78, 79, 85, 96, 128; 219/130.1, 130.21, 130.31, 130.32, 130.33, 130.4; 361/7, 100, 118

[56] References Cited

U.S. PATENT DOCUMENTS

| | | | |
|---|---|---|---|
| 2,444,168 | 6/1948 | Mulder | 219/130.1 |
| 2,449,456 | 9/1948 | Croco et al. | 219/130.1 |
| 2,502,646 | 4/1950 | Girard | 219/130.1 |
| 2,617,913 | 11/1952 | Oestreicher | 219/130.1 |
| 2,769,118 | 10/1956 | Lester | 219/130.1 |
| 2,775,735 | 12/1956 | de Jong et al. | 219/130.1 |
| 2,936,365 | 5/1960 | Niemi | 219/130.1 |
| 2,960,628 | 11/1960 | Rover | 219/130.1 |
| 4,015,188 | 3/1977 | Denis | 322/281 |
| 4,038,515 | 7/1977 | Risberg | 219/131 R |
| 4,151,396 | 4/1979 | Veal | 219/132 |
| 4,164,016 | 8/1979 | Schuchard | 363/85 |
| 4,310,744 | 1/1982 | Okada | 219/130.32 |
| 4,371,776 | 2/1983 | Winn | 219/130.51 |
| 4,392,046 | 7/1983 | Tzeng | 219/130.1 |
| 4,398,080 | 8/1983 | Johansson et al. | 219/130.1 |
| 4,450,340 | 5/1984 | Corrigall et al. | 219/132 |
| 4,730,352 | 3/1988 | Rovacchi | 363/85 |
| 5,187,428 | 2/1993 | Hutchison et al. | 323/250 |
| 5,260,545 | 11/1993 | West et al. | 219/130.1 |
| 5,308,952 | 5/1994 | Bunker et al. | 219/130.4 |

FOREIGN PATENT DOCUMENTS

| | | |
|---|---|---|
| 52-33855 | of 0000 | Japan . |
| 2000611 | 1/1979 | United Kingdom . |
| WO91/12922 | 9/1991 | WIPO . |

OTHER PUBLICATIONS

Welding Handbook, Chapter 3, Gas Tungsten Arc Welding, pp. 74–107, American Welding Society (1991).
International Electrotechnical Commission IEC Report, Publication 479–1 (1984).
ISO/TC44–IEC/TC26 JWG1(Sec) 34, Draft for a revision of IEC 974–1, Arc Welding Equipment, Power Sources (Jan. 1994).

Primary Examiner—Matthew V. Nguyen
Attorney, Agent, or Firm—Foley & Lardner

[57] ABSTRACT

A method and apparatus for providing an ac signal to load terminals, where the signal has a reduced open circuit voltage is disclosed. The apparatus includes an ac current source connected to the load terminals and an open circuit sensor. A control circuit is connected to the source of ac current and to the open circuit sensor, and when the sensor senses an open circuit the control circuit causes the current source to provide a dc signal. The dc signal is created by allowing the current source to provide a signal of only one polarity. The polarity may be either electrode positive or electrode negative. The current source may be either a phase controlled current source or an inverter. The method includes the steps of detecting the presence of an open circuit at the load terminals and causing the ac power source to provide a half wave signal of only one polarity in response to the detection of an open circuit.

29 Claims, 3 Drawing Sheets

REDUCED OPEN CIRCUIT VOLTAGE POWER SUPPLY AND METHOD OF PRODUCING THEREFOR

FIELD OF THE INVENTION

The present invention relates generally to power supplies and, in particular to a method and apparatus for providing ac power with a reduced open circuit voltage.

BACKGROUND OF THE INVENTION

In many welding processes it is desirable to provide an ac welding current. For example, both shielded metal arc welding (SMAW) and gas tungsten arc welding (GTAW), also called tungsten inert gas (TIG) welding, are often performed using an ac welding current. GTAW is a well known method for welding metals, in particular aluminum and magnesium, and a description of GTAW, including the problems associated with welding aluminum and magnesium, may be found in *Welding Handbook*, Chapter 3, Gas Tungsten Arc Welding, pages 74–107, 1991, published by the American Welding Society.

Phase controlled ac power supplies are known in the prior art. That is, the output current magnitude is controlled by varying the time at which electronic switches are closed with respect to the zero crossing of the input signal. Some prior art phase controlled welding power supplies provide an ac square wave output, having the frequency of the line. For example, U.S. Pat. Nos. 4,038,515 issued to Risberg, which is hereby incorporated by reference, and 4,371,776, issued to Winn, as well as Japanese Kakai 52-33855 assigned to Okada disclose such power supplies. Another type of prior art power supply is shown in PCT patent publication PCT/DE/91/00012, invented by Bodewigs. This power supply provides a substantially square wave output having a frequency that is one and one-half times greater than line frequency. FIGS. 1–4 show the basic power supplies of the '515 patent, the '776 patent, the Okada publication and the Bodewigs publication, respectively, but modified to be a reduced open circuit power supply in accordance with the present invention.

Other prior art phase controlled power supplies produce a sinusoidal output at the line frequency. One such power supply is disclosed in U.S. Pat. No. 5,187,428, which is hereby incorporated by reference. Still other prior art ac power supplies utilize an inverter to produce an ac output. This sort of power supply uses electronic switches to invert a dc signal, thereby providing an ac square wave output. Inverter power supplies often include a rectifier to produce the dc signal from the ac line input.

It is also well known in the art that in ac GTAW the arc extinguishes with every current reversal. When the reversal is to the work piece emitting (electrode negative), it is particularly difficult to reignite the arc. The work piece is generally below thermionic temperature. Also, the molten weld pool is very clean metal due to the ionic bombardment during past electrode positive half cycles. Both of these factors contribute to difficulty in reestablishing the electrode positive half cycle.

Because a higher open circuit voltage helps reignite (stabilize) an arc, it is desirable when welding with ac current to have the output voltage of the welding power source considerably higher during no load (open circuit) than during load (when the arc is present). Indeed, generally speaking, the greater the ratio of open circuit or no load voltage to welding or load voltage the smoother, easier and generally better a power source will operate. Thus, many of the prior art power supplies described above provide a higher open circuit voltage to help strike the arc. In the case of ac welding power sources the maximum allowable open circuit voltage (OCV) has been set by standards at 80 volts ac rms.

It is well known that an increased open circuit voltage is more dangerous. Thus, while 80 volts ac open circuit does assist in starting and stabilizing the arc, the operator must exercise considerable caution because of the potential that exists for a possible electric shock.

In the past there have been many attempts at providing a safer open circuit voltage. One is to use dc current to weld rather than ac because of the greater safety margin of dc. According to the International Electrotechnical Commission's (IEC) Publication 479-1 the ratio of a direct current to its equivalent rms value of alternating current having the same probability of ventricular fibrillation is 3.75 for shock durations longer than the period of one cardiac cycle.

Moreover, according to IEC 479-1 there is an additional safety advantage to dc current over ac current in the "let go threshold." The ac current level above which a person holding electrodes cannot let go of the electrodes is on the order of 10 milliamps for ac currents in the range of 15 to 100 Hz. While the exact let go threshold for dc current has not been established, it is considerably greater (greater than 300 Ma) than that of ac current.

While there is a safety incentive to use dc current for welding, many welding applications require ac current. For example, in places where "arc blow," the influence of a magnetic field to misdirect the arc, is a problem or when GTAW needs to be performed on refractory oxide metals such as aluminum and magnesium alloys, ac is often required. Thus, ac power supplies such as those described above are necessary.

In some circumstances the welding operator can be adequately protected from a hazardous ac shock by the use of dry insulating clothing (especially gloves), and by using insulating mats or boards to eliminate contact with the work piece.

However, in environments that are wet, physically confining, tight, cramped or hot where sweat can permeate clothing and gloves such safety precautions can be difficult or impossible. In such environments safety standards recommend the use of devices that reduce the open circuit voltage of welding power sources to a lower value while not welding. Some examples of prior art in this respect can be found in U.S. Pat. Nos. 4,450,340; 2,444,168; 2,769,118; 2,775,735; 4,015,188; 2,502,646; 2,960,628; 2,449,456; and 2,617,913.

Generally speaking, the prior art devices for reducing open circuit voltage (OCV) have been unsatisfactory. One of the primary reasons has been cost. The additional components necessary to accomplish OCV reduction in accordance with the prior art can increase the cost of the product significantly. Since most work is not done in the hazardous environments described above, the feature is often not ordered where it is an extra cost option or where a less expensive power source is available where this is not a standard feature.

Additionally, add-ons have not been popular because they get in the way, require extra wiring, are vulnerable to abuse, costly and require special or modified electrode holders. For examples of OCV reduction add-ons see U.S. Pat. Nos. 2,936,365 and 4,151,396.

Prior art OCV reduction devices often require a significant delay before restoring the high voltage. However, a delay of more than a few cycles before restoring high voltage may be noticed by an experienced operator. Also, when the welder makes electrode contact with the work piece it is done with a very brief tap or the electrode will weld itself to the work piece making the welder tug and wiggle the electrode to break the weld. During this crucial starting period the welder requires high current instantly or it creates a functional problem for him. Thus, to work satisfactorily an OCV reduction device must be very quick and it must be sensitive to the electrode to work impedance which indicates when the electrode contacts the work.

Moreover, the prior art OCV reduction devices required expensive added components. Such components, especially those required to conduct high current, require frequent maintenance and increase the possibility of failure.

Accordingly, there is a need for an ac welding power supply that includes a device to provide a reduced open circuit voltage. Preferably, such a device would provide a dc open circuit voltage to take advantage of the dc current safety advantage with respect to both ventricular fibrillation and the "let go threshold."

Additionally, there is a need for an OCV reduction device that reduces the OCV in ac welding power supplies, including phase controlled and inverter ac power supplies, yet still provide a dc, electrode positive, OCV. Preferably such an OCV reduction device would be economical and not an add-on. It should restore the high voltage without a significant delay and be sensitive to the electrode to work impedance. Finally the OCV reduction device should not require expensive added components and should be reliable.

SUMMARY OF THE PRESENT INVENTION

According to one embodiment of the present invention an ac power supply that produces an ac signal to load terminals, and has a reduced open circuit voltage is provided. The power supply includes an ac current source connected to the load terminals and an open circuit sensor. A control circuit is connected to the source of ac current and to the open circuit sensor, and when the sensor senses an open circuit the control circuit causes the current source to provide a dc signal. The dc signal is created by allowing the current source to provide a signal of only one polarity. The polarity may be either electrode positive or electrode negative. The current source may be either a phase controlled current source or an inverter.

In one alternative embodiment the control circuit provides a delay after the open circuit is sensed. In other alternative embodiments the sensor may be either a voltage sensor in parallel with the output terminals or a current sensor in series with the output terminals.

The method in accordance with the present invention includes the steps of sensing the presence of an open circuit at the load, a pair of terminals and causing the ac power source to provide a half wave signal of only one polarity in response to the detection of an open circuit.

In one embodiment the method includes the step of causing the ac power source to provide a half wave signal of only one polarity, either electrode negative or electrode positive. In an alternative embodiment the method includes the step of providing a delay after the presence of an open circuit has been detected. In yet another embodiment the method includes the step of providing a half wave signal having a peak voltage substantially equal to the peak voltage of the source of ac power source.

Other principal features and advantages of the invention will become apparent to those skilled in the art upon review of the following drawings, the detailed description and the appended claims.

Figure 1:
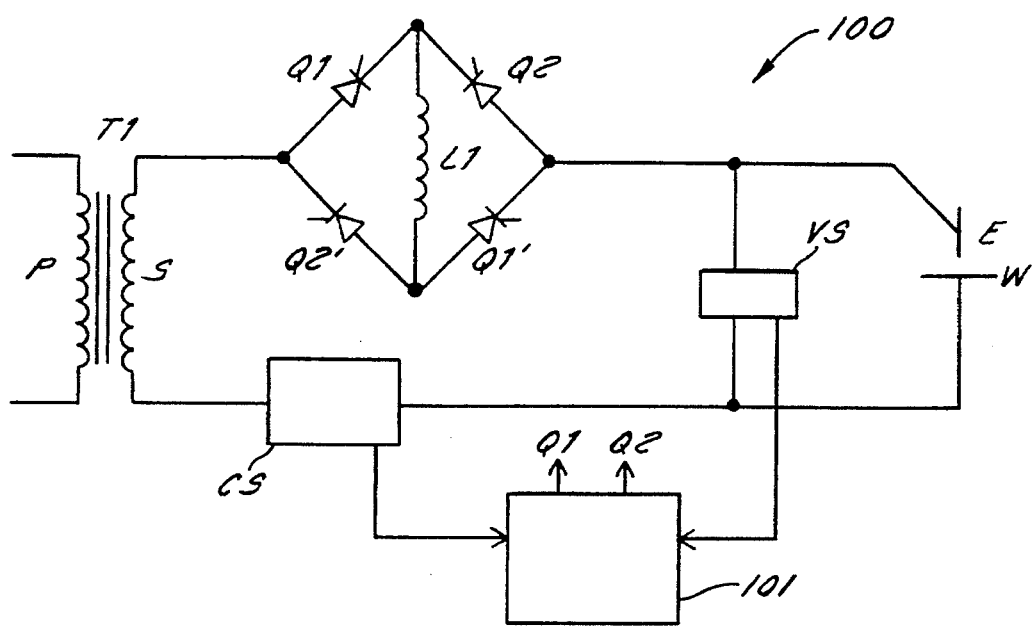
FIG. 1 is a schematic of a four SCR phase controlled ac square wave power supply that provides a reduced open circuit voltage in accordance with the present invention.

Before explaining at least one embodiment of the invention in detail, it is to be understood that the invention is not limited in its application to the details of construction and the arrangement of the components set forth in the following description or illustrated in the drawing. The invention is capable of other embodiments or being practiced or carried out in various ways. Also, it is to be understood that the phraseology and terminology employed herein is for the purpose of description and should not be regarded as limiting.

DETAILED DESCRIPTION OF A PREFERRED EXEMPLARY EMBODIMENT

As will be described in detail below, the reduced open circuit voltage power supplies disclosed herein maintain the peak open circuit voltage for the purposes of effective arc striking while providing a reduced rms OCV. Moreover, the power supplies include a fast, sensitive device, that is nearly "invisible" to the welder using the device, that provides a reduced open circuit voltage and that is implemented using many of the fundamental components already part of the power supplies.

Referring now to FIG. 1, a phase controlled asymmetrical ac square wave welder 100, such as that described in great detail in U.S. Pat. No. 4,038,515, is shown, with the reduced open circuit voltage device of the present invention. Power supply 100 provides an ac square wave adjustable balance welding current output to an electrode E and a work W, where both the balance control and output control may be accomplished in a single stage. It includes a transformer T1 having a single phase primary winding P and a single phase secondary winding S. The turns ratio is selected to provide an open circuit output voltage of approximately 80 volts, and the primary may be wound to receive 230 volts, or any other voltage such as 200, 460 etc.

Secondary S is connected to a plurality of SCR's Q1, Q1', Q2 and Q2', which are in a bridge configuration with an inductor L1 connected in the dc leg of the bridge. To provide current flow to the arc from electrode E to work W, SCR's Q1 and Q1' are turned on in phase with the secondary voltage, and to provide current to the arc from the work to the electrode, SCR's Q2 and Q2' are turned on. As described in the '515 patent, the phase at which SCR's Q1, Q1', Q2 and Q2' are turned on determines the magnitude of the output current.

Switches Q1, Q1', Q2 and Q2' are shown as SCR's or thyristors but do not need to be limited to these devices. SCR's and thyristors are in common use today in these circuits and are shown for this reason. As one skilled in the art will readily recognize, other solid state switches such as IGBT's, GTO's or FET's could also be used.

In either polarity the current through inductor L1 is in the same flux creating direction (down in the schematic). Inductor L1 maintains the current at a constant level, and provides a rapid zero crossing to produce a square wave under load conditions.

Figure 5:
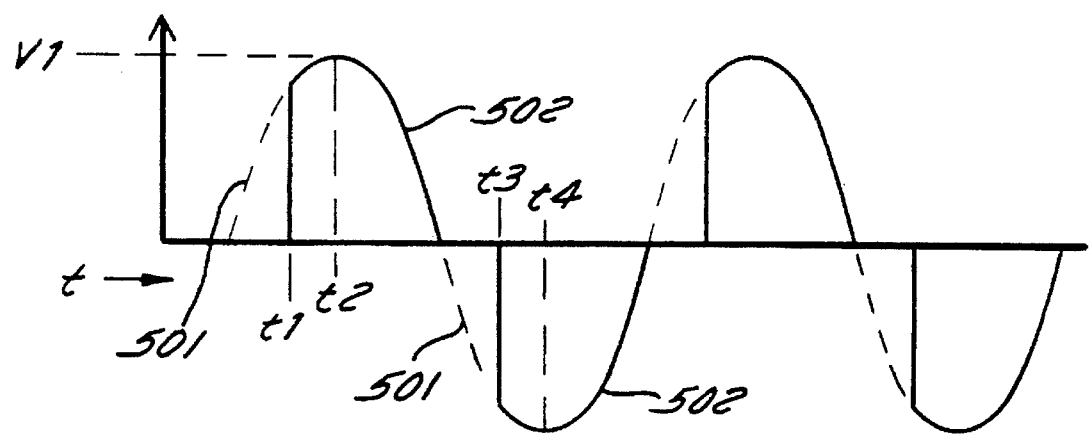
FIG. 5 shows the open circuit voltage wave shape of the power supplies of FIGS. 1–3 under early turn on conditions.

Under no load, the output is a portion of a sinusoidal wave in response to the phase control of semiconductor switches Q1, Q1', Q2 and Q2'. Turning the switches on early will cause the output to be a more complete sinusoid. Referring now to FIG. 5, a wave shape showing the open circuit voltage of the ac square wave welder 100, is shown when the switches are turned on early in the half cycle. A dashed curve 501 combined with the solid line 502 represents the complete sinusoidal input. Solid curve 502 represents the output open circuit voltage applied to electrode E and work W.

During the positive half cycle SCR's Q1 and Q1' are turned on at time t1. This impresses the secondary voltage across the electrode E and work W (except for switch and resistive losses) from time t1 until the end of the half cycle, as shown by solid curve 502. By observation it can be seen that the maximum positive open circuit voltage V1 that occurs 90° into the sine wave (time t2) will be provided to the output so long as SCR's Q1 and Q1' are turned on prior to time t2. This is the largest open circuit voltage the power supply can provide. The same is true for the reverse cycle. If SCR's Q2 and Q2' are turned on prior to time t4, the maximum negative open circuit voltage possible will be applied to work W and electrode E.

Figure 6:
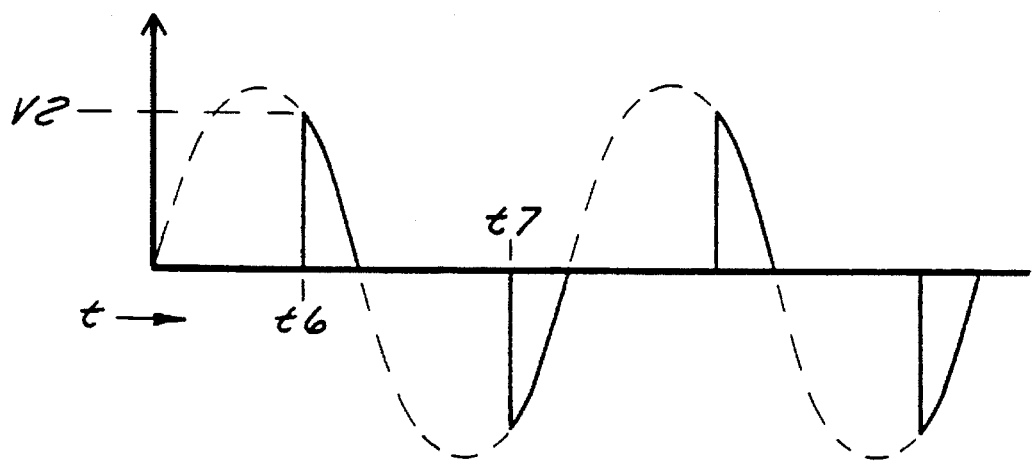
FIG. 6 shows the open circuit voltage wave shape of the power supplies of FIGS. 1–3 under late turn on conditions.

Referring now to FIG. 6, the effect of late turn on may be seen. In the positive and negative half cycles the SCR's are turned on at times t6 and t7, well after the peak voltage on the secondary. Thus, the peak open circuit V2 voltage is considerably less than V1 of FIG. 5.

Returning to FIG. 1, in accordance with the present invention, during open circuit conditions either pair of SCR's (Q1 and Q1' or Q2 and Q2'), but not both, are turned on each respective half cycle. This simple yet elegant scheme produces a dc OCV. Also, by turning the SCR's on early in the half cycle the peak voltage will be the maximum peak permissible, unreduced unlike prior art voltage reducer schemes.

As may be seen from FIG. 1, the components necessary to implement such an OCV reduction are minimal. A voltage sensor VS is provided in parallel with the output terminals. Voltage sensor VS provides a signal indicative of the voltage across the output terminals to a control circuit 101. Control circuit 101 provides the signals to the trigger of the SCR's to turn them on. To do so in accordance with this invention control circuit 101 determines from the magnitude of the signal from voltage sensor VS, if the arc is present. In the event that the load is absent (an open circuit exists) control circuit 101 causes only one of the SCR pairs to be turned on, essentially disabling the other pair of SCR's and disabling the ac output, thereby providing a dc output.

Voltage sensor VS and control circuit 101 may include electro-mechanical relays to control the SCR's, but it is advantageous to use an electronic sense and control system that is designed to be fast. For example, voltage sensor VS may simply be a resistive circuit with a rectifier and a smoothing filter that provides a signal indicative of the RMS load voltage.

Control circuit 101 may include a comparator to compare the sensed signal to a reference signal, having for example a value midway between the open circuit and arc voltages. Control circuit 101 may also include a conventional phase control (such as that shown in U.S. Pat. No. 4,038,515) with an enabling transistor in the trigger circuit whose gate is controlled by the output of the comparator. In any event, a wide variety of circuitry may be used to implement such a control and it is well within the ability of one ordinarily skilled in the art to select a control appropriate for a particular power supply.

A current sensor CS, also shown in FIG. 1, may also be used to determine if the load is present. As with voltage sensor VS, current sensor CS is preferably electronic and provides a signal to control circuit 101 indicative of the current in the load. Current sensor CS may be any type of sensor, including, but not limited to, a resistive sensor or an inductive sensor. In practice only one of voltage sensor VS or current sensor CS is needed to implement this invention, as either will sense an open circuit at the load. However, to provide a more reliable system it may be preferable to use both.

In an alternative embodiment control circuit 101 may be incorporated into one or both of current sensor CS and voltage sensor VS.

As soon as the arc is established current sensor CS and voltage sensor VS will indicate that an open circuit condition no longer exists, and control circuit 101 will enable the "off" pair of switches, and allow the normal phase control to operate.

In one embodiment Q1 and Q1' are turned on during open circuit conditions, and Q2 and Q2' are disabled by control circuit 101. This will produce an OCV where electrode E is positive with respect to the work, W. This is desirable in GTAW in most circumstances because it puts initial heat into the electrode to help start the arc. However, under other circumstances it might be desirable to have the electrode negative at OCV. Thus, an alternative embodiment is to turn on SCR's Q2 and Q2' and to disable Q1 and Q1'. While the remaining description of the preferred embodiment will be given with SCR's Q2 and Q2' being disabled by control circuit 101, in no way should that be construed as limiting the invention to such a configuration.

In order to start the arc the welder will often touch electrode E to work W, creating a short circuit. The OCV will immediately fall to zero (assuming Q1 and Q1' are on) and a current will flow that is limited by the impedances of L1 to an ac current. At least one of current sensor CS and voltage sensor VS will indicate an arc is desired. At that instant control circuit 101 will enable SCR's Q2 and Q2' and the power source will function normally.

The sensitivity of the system should be such that control circuit 101 will not enable Q2 and Q2' thereby starting the normal phase control and bringing up the full OCV when the voltage at voltage sensor VS is greater than the voltage produced when a 200 ohm resistor is placed between electrode E and work W. The resistance value is given by standard publication IEC 974-1. Similarly, control circuit 101 should not enable Q2 and Q2' if the current at current sensor CS is less than the current produced when a 200 ohm resistor is placed between electrode E and work W.

One advantage of using both current sensor CS and voltage sensor VS is to make a fail safe circuit. For example, when voltage sensor VS senses high rms voltage for more than a predetermined time, or when voltage sensor VS senses a high rms voltage but current sensor CS does not sense current the existence of a hazardous condition probably exists. In such an event control circuit 101 could cause an alarm (not shown) to sound and all four SCR's could be disabled.

When the arc is broken for an instant it is undesirable for the OCV to immediately return to the low value. The welding operator will then experience "arc outages" or noticeable undesirable delays while welding. It is, therefore, desirable to hold the OCV high for a delayed period and not let it go immediately low when VS senses a voltage higher than welding voltage or CS senses a no current situation. Such a delay may be provided by a timer in control circuit 101. The delay may be of any length, but in the interest of safety reasons a delay of 2 seconds is provided in one embodiment. This is consistent with IEC TC 26/ISO TC44 draft of 974-1, *Arc Welding Equipment, Power Sources*. Thus, in one embodiment control circuit 101 provides a delay prior to disabling the SCR's.

In accordance with another embodiment of this invention a resistance is provided to allow a higher voltage while welding than the OCV. This is possible because inductor L1 receives only voltage pulses during open circuit conditions, and the time interval between such pulses will allow some core reset. Accordingly, the impedance of inductor L1 will be larger than if the core had not reset. Thus, if an operating voltage higher than 80 volts ac rms is desired, a resistance R (shown in FIG. 2) is placed across electrode E and work W during start to limit the peak voltage during open circuit conditions. The resistance R in ohms is given by $OCV_p = V_s - VR$, where $VR = I_R*(X_L+R)$, or combining these equations $OCV_p V_s - I_R*X_L + I_R*R$. In these equations R is the resistance in parallel with the electrode E and work W, $I_R$ is a current through R that is lower than the sense point of current sensor CS, $X_L$ is the impedance of the inductor (L2 in FIG. 2) to half wave pulses, $OCV_p$ is the peak open circuit or no load voltage measured between electrode E and work W, and V, is the peak secondary voltage of T2. Of course, the resistance R may be used with any power source, including those shown in FIGS. 1, 3 and 4.

In yet another embodiment a small capacitor such as 0.5 mfd (depending on the output impedance of the power source) is provided in parallel to the output to convert the pulses to a more constant level of dc. This may be beneficial if it is determined at some later time that a steady dc has a higher safety potential than pulsing dc.

Figure 2:
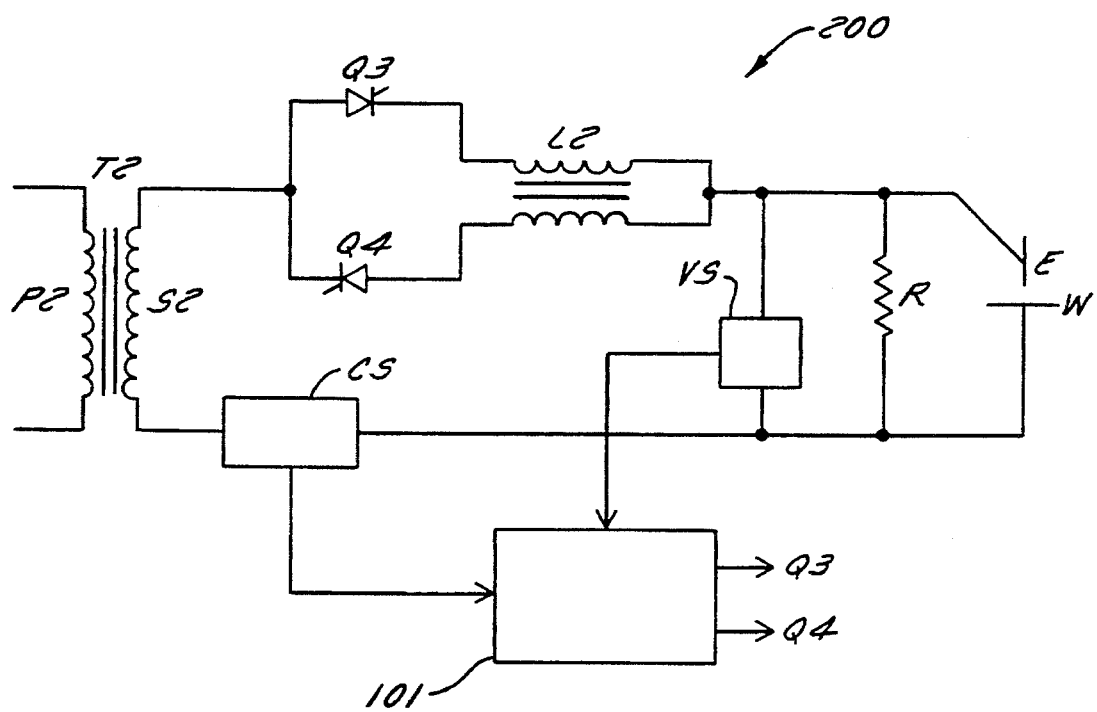
FIG. 2 is a schematic of a 2 SCR phase controlled ac square wave power supply that provides a reduced open circuit voltage in accordance with the present invention.

Referring now to FIG. 2, another alternative embodiment of the reduced open circuit voltage power supply is shown. A power supply 200, substantially that shown in U.S. Pat. No. 4,371,776, with the addition of the inventive reduced open circuit voltage device includes a transformer T2 having a primary winding P2, and a secondary winding S2. Secondary winding S2 is connected to a pair of SCR's Q3 and Q4 arranged in a bridge configuration. The output of the bridge is connected to a center tap inductor L2 where each end of inductor L2 is connected to one of SCR's Q1 and Q2 and the center tap of inductor L2 is connected to electrode E. Also shown in FIG. 2 is the work W, voltage sensor VS, current sensor CS and control circuit 101.

Power supply 200 functions essentially the same as power supply 100, except that inductor L1 has been divided into a center tap inductor L2 and the four SCR bridge has been replaced with a two SCR bridge. As with the power supply of FIG. 1, the power supply of FIG. 2 produces a substantially square wave output having adjustable balance. Inductor L2 is configured so that current flows in the same flux creating direction through it, regardless of the direction of current through the arc (load).

Voltage sensor VS is connected in parallel with the output terminals, and current sensor CS is connected in series with the output terminals. As in the embodiment of FIG. 1, current sensor CS provides a signal to control circuit 101 indicative of the magnitude of the current flowing through the load. Similarly, voltage sensor VS provides a signal to control circuit 101 indicative of the voltage across the load. Based on the signal or signals received from current sensor CS and/or voltage sensor VS, control circuit 101 will disable either SCR Q3 or Q4, depending on the desired polarity of the OCV. Thus the open circuit voltage will be of only one polarity and the dangers associated with an ac open circuit voltage will be avoided.

Also shown in FIG. 2 is a resistance R in parallel with electrode E and work W to provide a small resistance which allows a greater start up voltage while still providing an 80 volt rms open circuit voltage, as described above.

Figure 3:
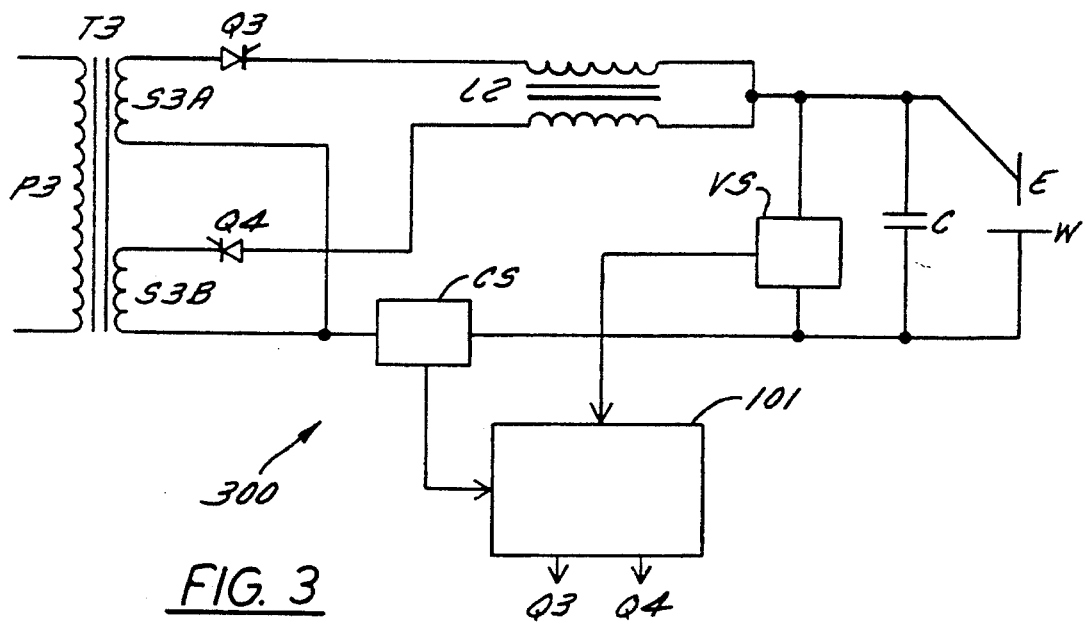
FIG. 3 is a schematic of a split secondary, 2 SCR phase controlled ac square wave power supply that provides a reduced open circuit voltage in accordance with the present invention.

Referring now to FIG. 3, yet another embodiment of the present invention is shown. A power supply 300 is similar to the power supply 200 of FIG. 2, except that the secondary winding in FIG. 3 has been separated into two secondary windings S3A and S3B. Inductor L2 is still a center tap inductor and only two SCR's (Q3 and Q4) are needed. Power supply 300 of FIG. 3 is essentially that shown in Japanese Kakai 52-33855, with the addition of the inventive reduced open circuit voltage device.

As in FIG. 2, voltage sensor VS is connected in parallel with the output terminals, and current sensor CS is connected in series with the output terminals. Current sensor CS and/or voltage sensor VS provide the appropriate signals to control circuit 101. Based on the signal or signals received control circuit 101 will disable either SCR Q3 or Q4, depending on the desired polarity of the OCV.

The embodiment of FIG. 3 also shows a small capacitance C connected across electrode E and work W to provide a more constant dc value, as described above. As one skilled in the art will readily recognize, the additional features shown in FIG. 2 (the resistance) and FIG. 3 (the capacitance) may be easily incorporated into other embodiments.

Figure 4:
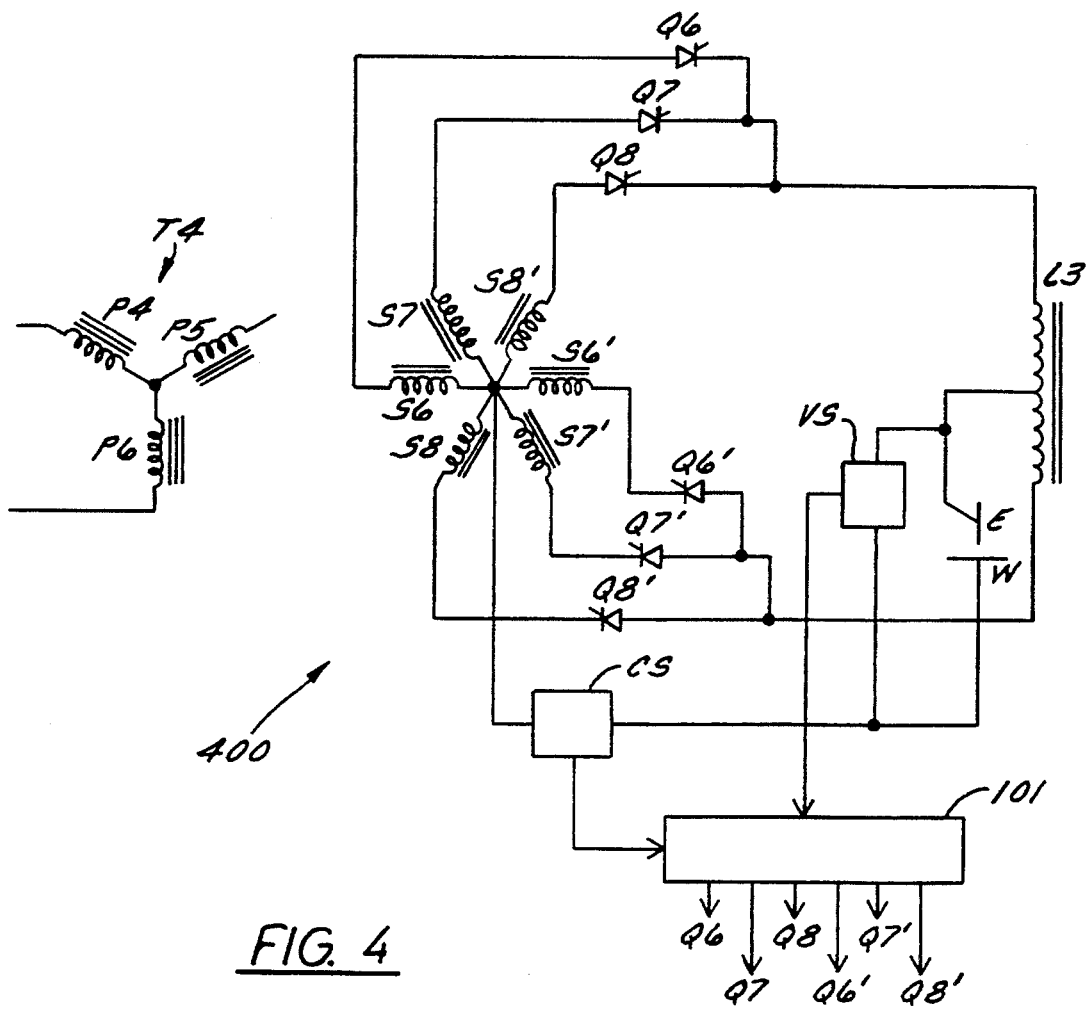
FIG. 4 is a schematic of a three-phase, phase controlled ac square wave power supply that provides a reduced open circuit voltage in accordance with the present invention.

Referring now to FIG. 4, a three-phase reduced open circuit power supply 400 such as the type in PCT patent publication PCT/DE91/00012, but with the inventive reduced open circuit voltage device, is shown. Power supply 400 includes a three-phase primary T4 having three primary windings P4–P6 and three center tap secondary windings S6–S8, configured in a star configuration.

Each secondary winding has associated with it one pair of SCR's (Q6 and Q6', Q7 and Q7', Q8 and Q8') to regulate the flow through the winding. As described in PCT publication PCT/DE91/00012, the output may be phase controlled to be a square wave output having a frequency of 1½ times the input line frequency. A center tap inductor L3 is provided between the windings and the load. As in the power supplies of FIGS. 1–3, the current flows in the same flux creating direction through the inductor, regardless of the direction through the load to produce a square wave output.

In this embodiment, current sensor CS provides a signal to control circuit 101 indicative of the magnitude of the current flowing through the load. Similarly, voltage sensor VS provides a signal to control circuit 101 indicative of the voltage across the load. Based on the signal or signals received from current sensor CS and/or voltage sensor VS, control circuit 101 will disable the positive or negative half cycle SCR's (i.e., disable either SCR's Q6, Q7, and Q8, or SCR's Q6', Q7', and Q8'). Accordingly, the open circuit voltage will be of only one polarity and the dangers associated with an ac open circuit voltage will be avoided.

In other embodiments current sensor CS, voltage sensor VS and control circuit 101 may be used with other types of power supplies, such as a sinusoidal power supply or an inverter power supply. In each case, control circuit 101 disables one polarity of the open circuit output, thereby producing a dc OCV.

Besides providing a safety advantage due to a dc OCV, rather than the prior art ac OCV, the reduced OCV power supplies described above provide an additional safety factor due to the current delivered, assuming a person receives a shock. As stated in IEC 479-2, for a dc current the fibrillation hazard is approximately the same as that from an equivalent alternating current, Iev, where Iev is:

$$Iev = \frac{Irms}{\sqrt{2}}$$

where $$Irms = \frac{I\,PEAK}{2}$$

as long as the duration is longer than 1.5 times the period of a cardiac cycle.

With prior art ac OCVs, rms current would be 80 volts divided by the resistance of a body. With the reduced open circuit voltage power supplies disclosed herein, and a 113 volt peak (80 volt half wave*$\sqrt{}\sqrt{2}$) the equations become:

Erms=113/2=56.57v giving $$Eev = \frac{Erms}{\sqrt{2}} = 40\,v$$

and thus $I_{ev}$ equals 40 volts divided by the resistance of a body, about a factor of 2 improvement.

Thus, the equivalent current would be 40 volts divided by the bodies resistance. In other words, the reduced OCV power supplies disclosed herein provide the same risk due to current as a prior art power supply having one-half the OCV. In the case of FIG. 4, the formulas are different but so, too, is the rms value. This causes the final values to be the same as for FIGS. 1, 2 and 3.

Thus, it should be apparent that there has been provided in accordance with the present invention a power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An ac power supply for providing an ac signal to a first and a second output terminal, and having a reduced open circuit voltage comprising:

a source of ac current connected to the output terminals, including at least one first polarity switch and at least one opposite polarity switch;

an open circuit sensor; and a control circuit, connected to the source of ac current and to the open circuit sensor, wherein the control circuit includes a disabling circuit which disables the at least one first polarity switch, causing the current source to provide a dc open circuit voltage having a reduced average magnitude.

2. The power supply of claim 1, wherein the source of current is a phase controlled current source.

3. The power supply of claim 2, wherein the first polarity is electrode negative.

4. The power supply of claim 2, wherein the first polarity is electrode positive.

5. The power supply of claim 1, further comprising means for delaying the disabling for a predetermined period of time.

6. The power supply of claim 1, wherein the source of current is an inverter.

7. The power supply of claim 6, wherein the first polarity is electrode negative.

8. The power supply of claim 6, wherein the first polarity is electrode positive.

9. The power supply of claim 1, further comprising a resistance in parallel with the first and second output terminals.

10. The power supply of claim 1, further comprising a capacitance in parallel with the first and second output terminals.

11. The power supply of claim 1, wherein the dc signal has a peak voltage substantially equal to the peak voltage of the source of ac current.

12. The power supply of claim 1, wherein the open circuit sensor is a voltage sensor in parallel with the first and second output terminals.

13. The power supply of claim 1, wherein the open circuit sensor is a current sensor in series with at least one of the first and second output terminals.

14. An ac power supply for providing an ac signal to a first and a second output terminal, and having a reduced open circuit voltage comprising:

ac current means for providing a signal having a first polarity portion and an opposite polarity portion, the ac current means being connected to the output terminals;

sensor means for providing a signal indicative of the presence of an open circuit; and control means, connected to the ac current means and responsive to the open circuit sensor, for disabling the first polarity portion, to cause the ac current means to provide a dc open circuit voltage having a reduced average magnitude.

15. The power supply of claim 14, wherein the ac current means is a phase controlled current source.

16. The power supply of claim 14, wherein the first polarity is electrode negative.

17. The power supply of claim 14, wherein the first polarity is electrode positive.

18. The power supply of claim 14, further comprising means for delaying the disabling for a predetermined period of time.

19. The power supply of claim 14, wherein the ac current means is an inverter.

20. The power supply of claim 14, wherein the dc signal has a peak voltage substantially equal to the peak voltage of the source of ac current.

21. The power supply of claim 14, wherein the sensor means is a voltage sensor in parallel with the first and second output terminals.

22. The power supply of claim 14, wherein the sensor means is a current sensor in series with at least one of the first and second output terminals.

23. A method of providing a reduced open circuit voltage from an ac power source including at least one first polarity switch and at least one second polarity switch comprising the steps of:

detecting the presence of an open circuit at the load terminals;

disabling the at least one second polarity switch in response to the detection of an open circuit, to cause the ac power source to provide a dc open circuit voltage of the first polarity having a reduced average magnitude.

24. The method of claim 23, wherein the step of disabling includes the step of causing the ac power source to provide a half wave signal of only electrode negative polarity.

25. The method of claim 23, wherein the step of disabling includes the step of causing the ac power source to provide a half wave signal of only electrode positive polarity.

26. The method of claim 23, wherein the step of causing the ac power source to provide a signal of only one polarity is delayed for a predetermined period of time after the presence of an open circuit has been detected.

27. The method of claim 23, further comprising the step of providing a resistance in parallel with the first and second output terminals.

28. The method of claim 23, further comprising the step of providing a capacitance in parallel with the first and second output terminals.

29. The method of claim 23, wherein the step of causing the ac power source to provide a signal of only one polarity in response to the detection of an open circuit includes the step of causing the ac power source to provide a half wave signal having a peak voltage substantially equal to the peak voltage of the source of ac power source.

* * * * *